(12) United States Patent
Parsons

(10) Patent No.: US 6,533,126 B1
(45) Date of Patent: Mar. 18, 2003

(54) PRODUCE SIZING TRANSPORT MECHANISM

(75) Inventor: Ian A Parsons, Mooroopna (AU)

(73) Assignee: E.D. Parsons Engineering PTY LTD (AU)

(*) Notice: Subject to any disclaimer, the term of this patent is extended or adjusted under 35 U.S.C. 154(b) by 0 days.

(21) Appl. No.: 09/623,185
(22) PCT Filed: Feb. 22, 1999
(86) PCT No.: PCT/AU99/00103
§ 371 (c)(1),
(2), (4) Date: Aug. 29, 2000
(87) PCT Pub. No.: WO99/44922
PCT Pub. Date: Sep. 10, 1999

(30) Foreign Application Priority Data

Mar. 3, 1998 (AU) .............................................. PP 2124
Nov. 23, 1998 (AU) .............................................. PP 7242

(51) Int. Cl.⁷ ................................................ B07C 5/36
(52) U.S. Cl. ........................ 209/617; 209/912; 209/919; 209/586; 209/587; 198/370.03; 198/803.11; 198/485.1; 198/680
(58) Field of Search .................................. 209/617, 912, 209/919; 198/370.3, 803.14, 803.11, 485.1, 680

(56) References Cited

U.S. PATENT DOCUMENTS 5,311,976 A  5/1994  Backman .................... 198/349

FOREIGN PATENT DOCUMENTS

| WO | WO92/18258 | 10/1992 | .............. B07C/5/18 |
| WO | WO94/06709 | 3/1994 | ............ B65G/17/32 |
| WO | 9225415 | 9/1997 | .............. B07C/5/36 |
| WO | WO 97/42112 | * 11/1997 | |

OTHER PUBLICATIONS

PCT Search Report of PCT/AU99/00103—dated Apr. 15, 1999.

* cited by examiner

Primary Examiner—Donald P. Walsh
Assistant Examiner—Jonathan R Miller
(74) Attorney, Agent, or Firm—Myers Bigel Sibley & Sajovec

(57) ABSTRACT

A produce sizing transport mechanism includes an endless conveyor carrying a plurality of downwardly depending produce retaining members which define an elongated produce retaining zone below at least one portion of the endless conveyor. At least part of the produce retaining members may be movable between a first closed position in which produce is retained within the elongated produce retaining zone and a plurality of further open positions enabling produce of predetermined sizes or size ranges to be released from the produce retaining zone. The retaining members may include a produce support region located generally beneath the produce retaining zone when the produce retaining members are located in the first closed position.

23 Claims, 8 Drawing Sheets

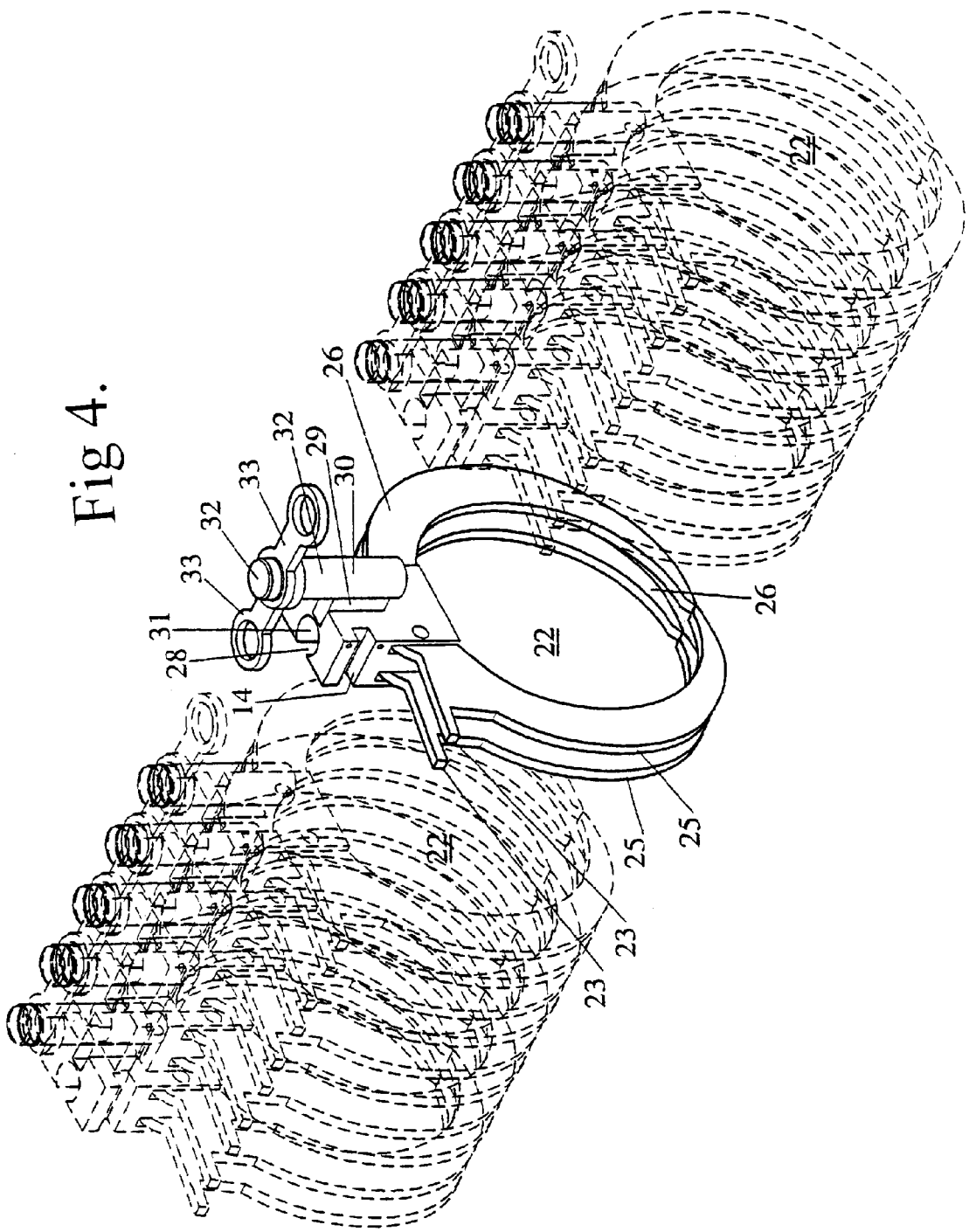

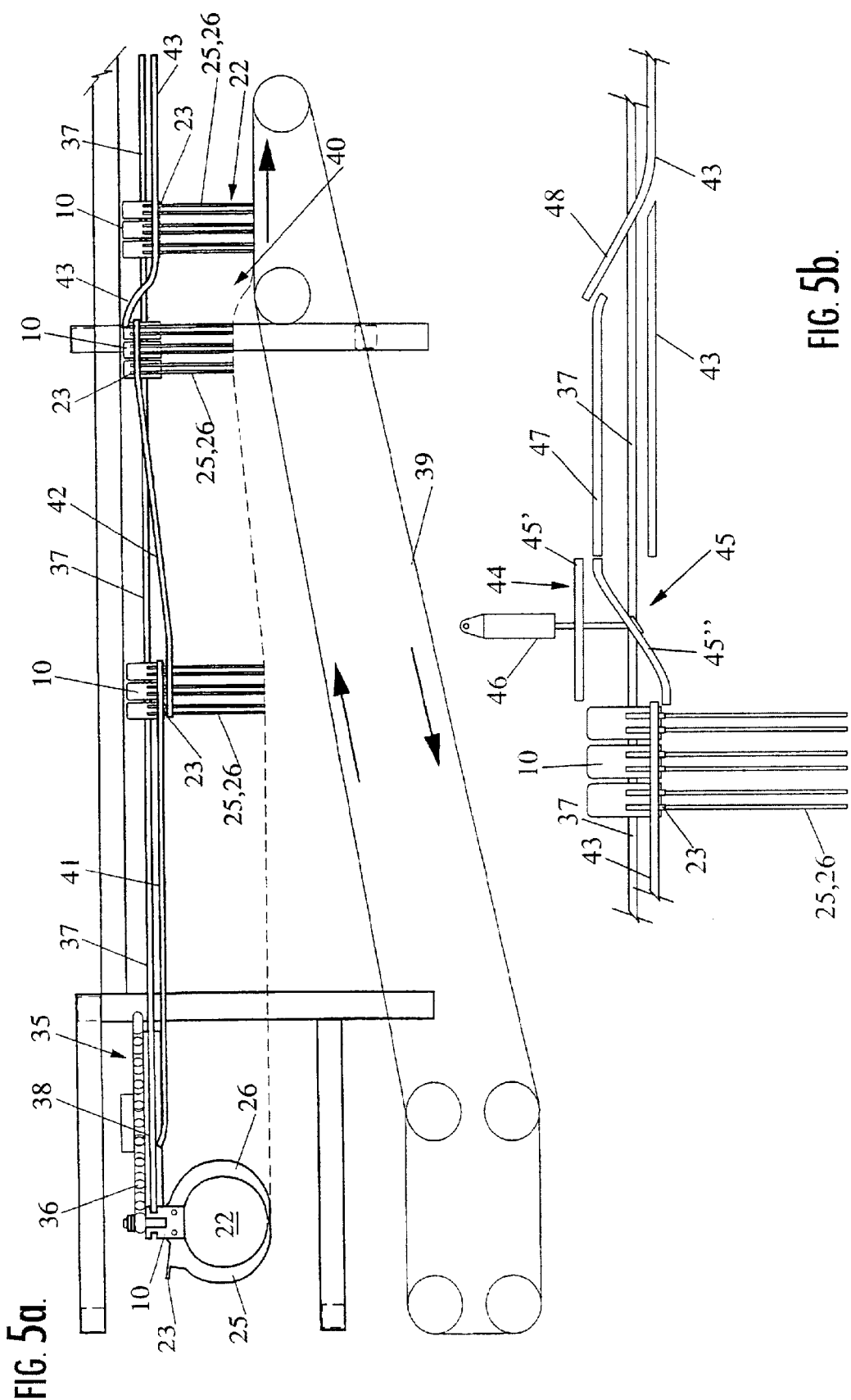

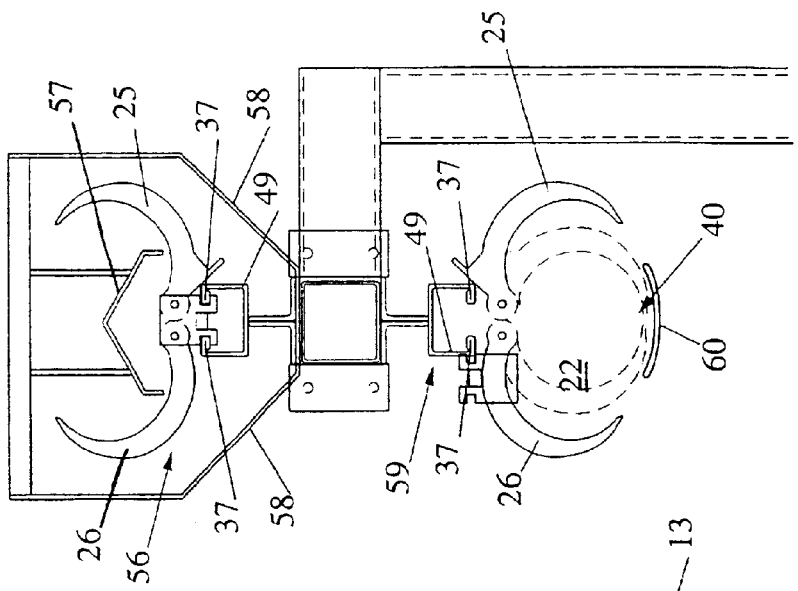
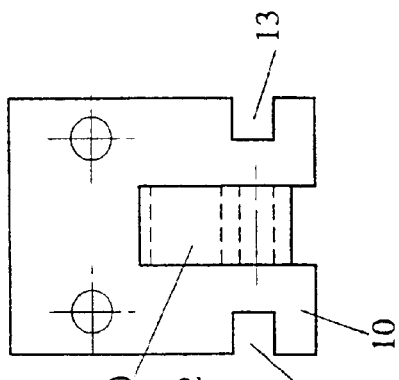
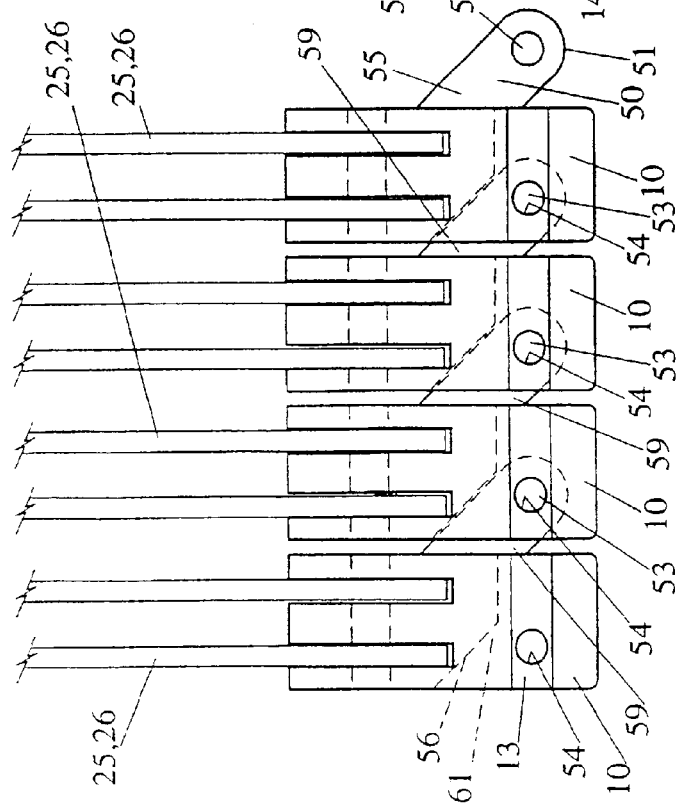

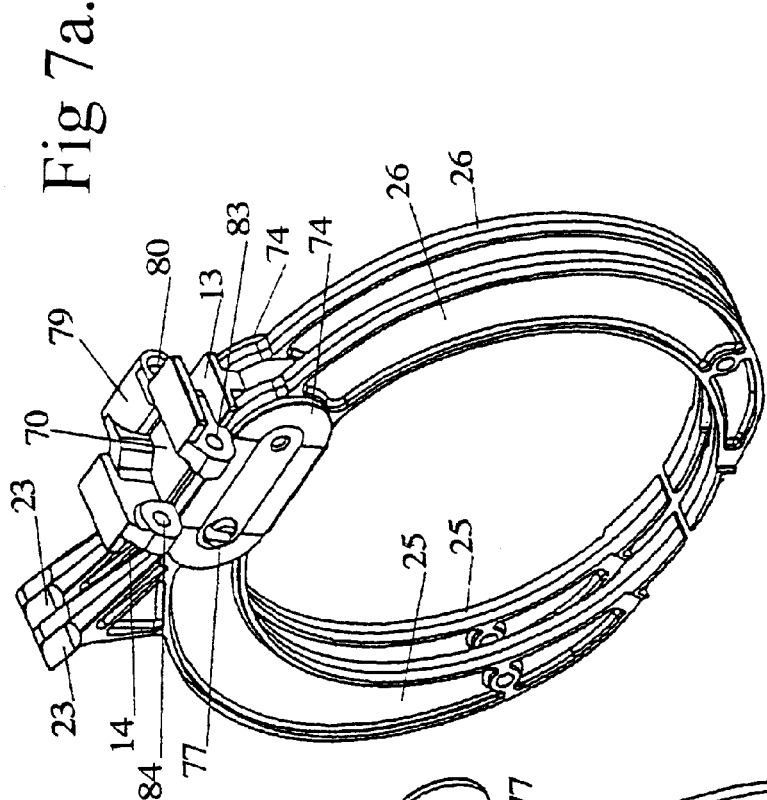
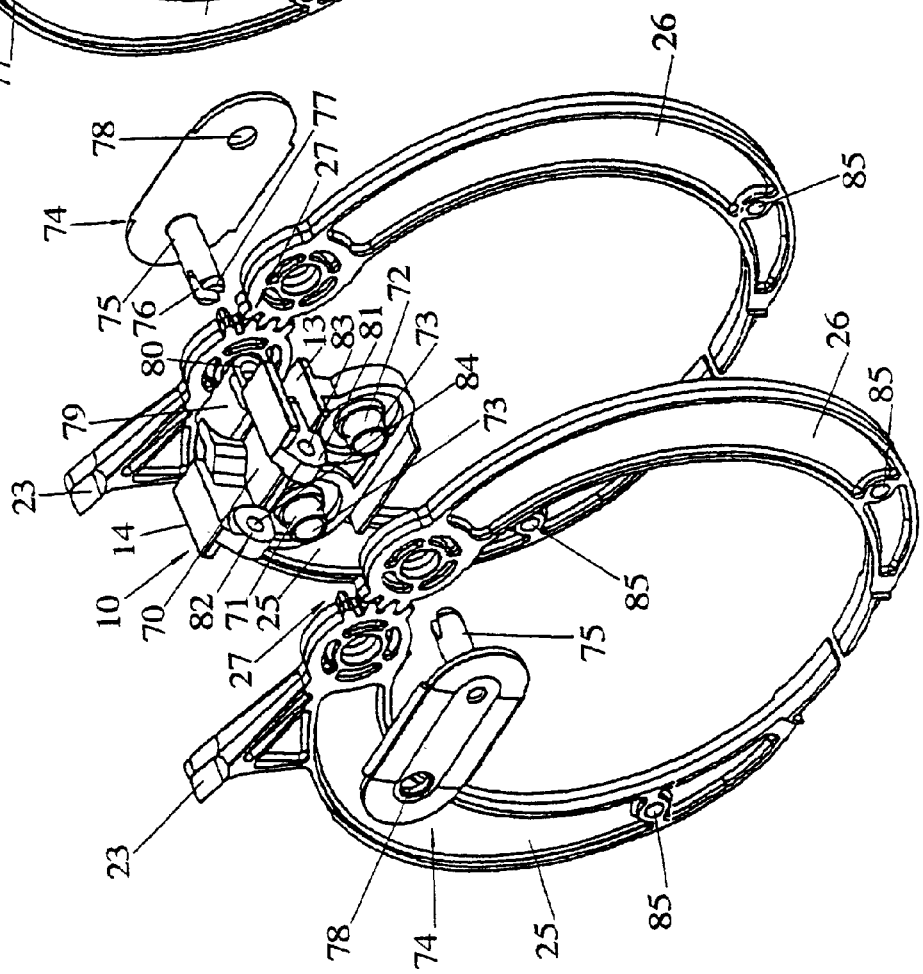
Fig 7a.
Fig 7b.

PRODUCE SIZING TRANSPORT MECHANISM

RELATED APPLICATIONS

This application claims priority from PCT/AU99/00103, filed Feb. 22, 1999, which claims priority from Australian Application Nos. PP 2124, filed Mar. 4, 1998, and PP 7242, filed Nov. 23, 1998.

FIELD OF THE INVENTION

The present invention relates to improvements in transport arrangements for use in fresh produce (fruit and vegetables) sizing machines.

BACKGROUND OF THE INVENTION

Typically, sizing machines will include one or more conveyor mechanisms including cups or belts of the type which carry the produce on the belt for transport to a position where they are discharged, depending on their size, colour or other variables, to an end discharge point where they are packed into cartons or other similar transport containers. While these arrangements work quite well with clean fruit or vegetables, they do have the disadvantage that any dirt or other material with the produce will tend to fall from the transport conveyor into the mechanism running the conveyor and can cause damage to this mechanism. Further, belt and other conveyors, in some situations, can cause damage to the produce being handled and it is therefore a general requirement that produce should not, as far as possible, be dropped or moved in a non-controlled fashion likely to cause damage.

The term "produce" used throughout this specification should be taken as meaning any fruit or vegetable item or any other comparable item.

SUMMARY OF THE INVENTION

The objective therefore is to provide a transport arrangement capable of use in produce sizing machines which will avoid or minimise the disadvantages identified above with known transport arrangements in produce sizing machines.

Accordingly, the present invention provides a transport arrangement for a produce sizing or sorting apparatus, said transport arrangement having an endless conveyor carrying a plurality of downwardly depending produce retaining members defining an elongate produce retaining zone below at least one portion of the endless conveyor, at least part of said produce retaining members being movable between a first closed position in which produce is retained within said elongate retaining zone, and a plurality of further open positions enabling produce of predetermined sizes or size ranges to be released from said produce retaining zone, said retaining members including a support region adapted for location generally beneath said produce when said produce retaining members are located in said first closed position.

In accordance with a further aspect, the present invention provides a transport arrangement for a produce sizing or sorting apparatus having an endless conveyor defining at least a first path of movement, said endless conveyor carrying a plurality of transversely spaced and longitudinally spaced downwardly depending produce retaining members, said produce retaining members each having a produce support region at a free end, said produce retaining members defining, in a first closed position of said retaining members, a produce retaining zone extending at least partially longitudinally in the direction of said first path of movement beneath at least part of said endless conveyor, at least some of said produce retaining members being movable whereby at least the produce support regions of said retaining members move transversely away from opposed said produce retaining members to permit selective release of produce from said produce retaining zones, the produce support regions of said produce retaining members being located generally beneath said produce when said produce retaining members are located in said first closed position.

Conveniently the produce retaining members on one side of said produce retaining zone are all selectively movable. Preferably the aforesaid movement occurs at one or more spaced locations along said first path of movement. Conveniently the produce retaining members on both sides of said produce retaining zone are all selectably movable transversely away from the retaining members on the other side of said retaining zone. Preferably movement of said retaining members is selectably adjustable to differing positions at spaced locations along said first path of movement. Preferably at least each said produce retaining member that is movable includes an inwardly directed free end portion that is adapted to engage at least partially under produce held in said produce retaining zone when said retaining members are in said first closed position. Preferably all the produce retaining members include such an inwardly directed free end portion. In a preferred embodiment the first path of movement of said endless conveyor is such that it does not pass vertically above or below itself.

A produce sizing and sorting apparatus as aforesaid has the advantage that dirt, refuse or the like that might be dislodged from the produce being handled, cannot fall into the working parts of the conveyor mechanism causing damage thereto. Moreover the produce is handled in a gentle manner by the retaining members being capable of picking up the produce from an infeed conveyor with minimum jarring movement of the produce itself. Similarly release of produce from the apparatus can be achieved in a similarly gentle manner.

In accordance with a still further aspect the present invention provides a transport arrangement for a produce sizing or sorting apparatus, said transport arrangement having a plurality of carrier members pivotally connected to one another to form an endless conveyor, each said carrier member having at least one finger member pivoted thereto such that the finger members depend downwardly from the carrier members at least along a portion of said endless conveyor to define a produce retaining zone when said finger members are in a first closed position, each said finger member having a produce support region at a free end and to be located under said produce when said finger members are in said first closed position, said produce retaining zone having a substantially uniform cross-section extending in the direction of movement of said endless conveyor along at least said portion of the endless conveyor and said produce retaining zone being bounded at least in part by a plurality of said finger members, at least some of said finger members, in use, being pivotable, about an axis generally parallel to said endless conveyor, to an open position enabling produce to be released from said produce retaining zone.

Conveniently each said finger member includes a pivot means at one end zone and a curved section at an opposed end zone. In one preferred embodiment, each said finger member includes a laterally extending lever arm intermediate the said end zones, said lever arms in use being contactable by control members to move said finger members from the closed position to the open positions and vice versa.

In another preferred embodiment, opposed pairs of finger members are interlinked whereby movement of one finger member of the pair about its pivot means will cause an opposed pivoting movement of the other finger member of the pair. In such an embodiment only one finger member of each opposed pair needs to have a lever arm as aforesaid.

In accordance with a still further aspect the present invention provides a transport arrangement for a produce sizing or sorting apparatus, said transport arrangement having an endless conveyor means carrying a plurality of downwardly depending produce retaining members defining an elongate produce retaining zone below at least one portion of the endless conveyor means, at least part of said produce retaining members being movable between a first closed position in which produce is retained within said elongate retaining zone, and a plurality of further open positions enabling produce of predetermined sizes or size ranges to be released from said produce retaining zone at a predetermined transfer station by an actuation means characterised in that the actuation means is located at the transfer station and is adapted to hold the produce retaining members open during the release of the produce at the predetermined transfer stations.

In accordance with a still further aspect the present invention provides a produce retaining apparatus for a produce transporting arrangement, wherein the produce retaining apparatus includes produce retaining members adapted to depend from the transport arrangement next to other produce retaining members such that an elongate produce retaining zone is formed, and at least one produce retaining member is adapted to be positively moved by an actuation means on the transporting arrangement to release the produce from the produce retaining zone.

Preferably the finger members are made from a hard wearing plastics material such as polyurethane so as to provide gentle contact with the produce being handled but be hard wearing in use.

BRIEF DESCRIPTION OF THE FIGURES

Several preferred embodiment will now be described with reference to the accompanying drawings, in which:

FIG. 3b is a rear elevation of the element shown in FIG. 3a;

FIG. 4 is a perspective view of an element as shown in FIGS. 3a to 3c with a plurality of other similar elements shown in dashed outline combining to form a part of a produce retaining zone;

FIGS. 5a and 5b are side elevation views of apparatus in accordance with this invention including elements as depicted in FIGS. 3a to 3c and 4;

FIG. 6a is a side elevation of a plurality of elements of a third preferred embodiment of the transport arrangement of the present invention, the finger members being constructed generally as shown in FIGS. 3a, 3b and 3c;

FIG. 6b is a front elevation view of the elements shown in FIG. 6a omitting the finger members;

FIG. 6c is an illustrative cross-sectional view through a transport arrangement including a combination of elements shown in FIGS. 6a and 6b;

FIG. 7a is an exploded perspective view of a pair of finger members together with parts adapted to form a carrier member therefore when assembled forming a fourth preferred embodiment; and FIG. 7b is a perspective view of the parts shown in FIG. 7a when assembled.

DETAILED DESCRIPTION OF THE INVENTION

Figure 1:
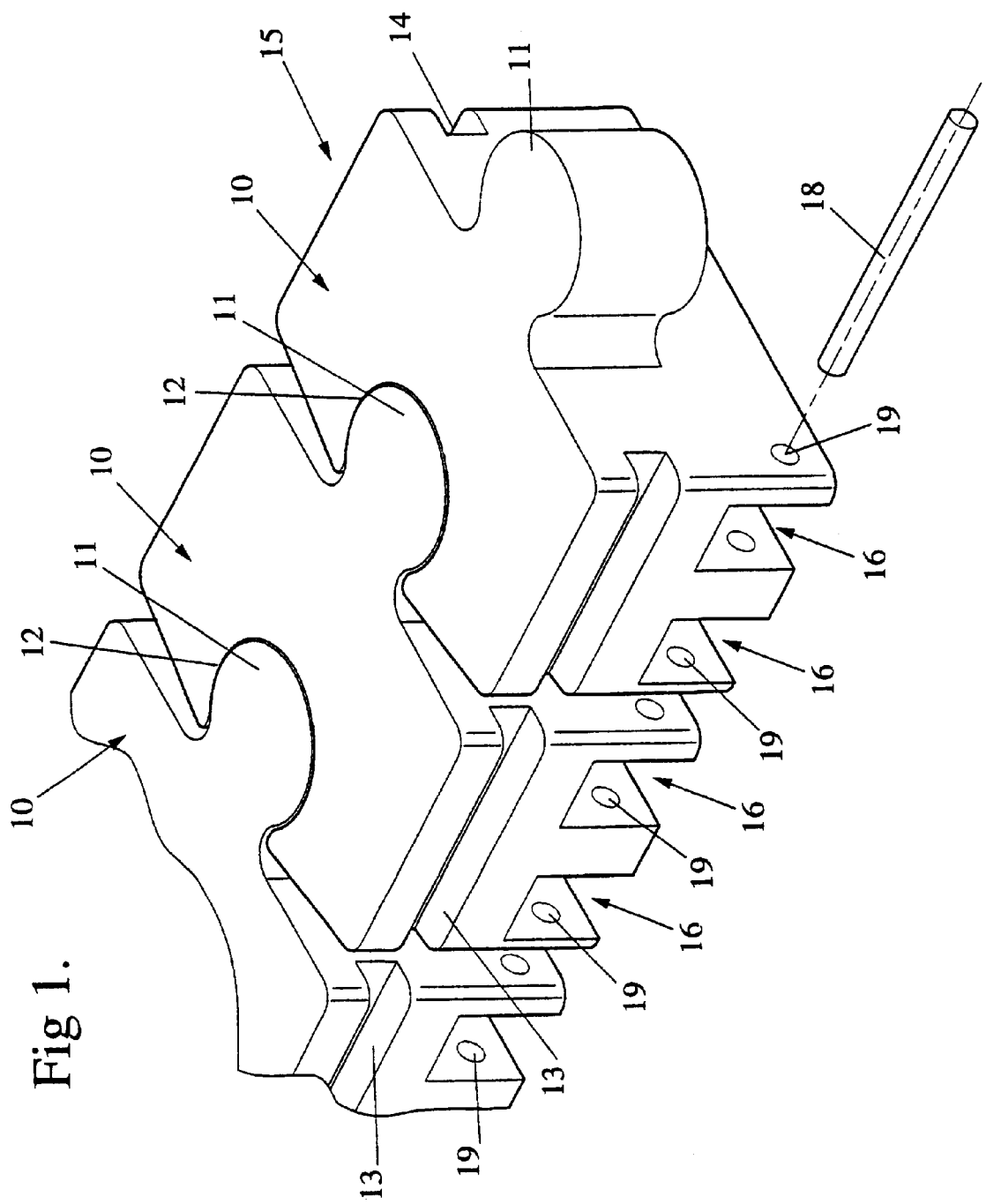
FIG. 1 is a partial upper perspective view of several carrier members in accordance with one preferred embodiment of the present invention.

Referring to FIG. 1, the transport arrangement according to this preferred embodiment of the present invention comprises a plurality similarly configured carrier blocks 10 each having a forwardly located integrally formed pivot pin 11 and a complementary shaped pivot pin receiving aperture 12 at an opposed end. As a result an endless chain 15 can be formed by a plurality of such members being connected with the pivot pins 11 engaged in the pivot,pin apertures 12. Each carrier member 10 further includes longitudinally extending grooves 13,14 adapted to receive a support rail (not shown) to support the endless chain 15 in any desired path of movement. In the lower section of each carrier member 10 there are two or more recesses 16 adapted to receive the upper ends of pivoting finger members 17 (see FIGS. 2A and 2B) on a pivot pin 18 passing through bores 19. In a possible alternative arrangement the carrier block members might be replaced by a separate pair of chain or similar conveyors, each adapted to separately carry a plurality of said finger members 17.

Figure 2A:
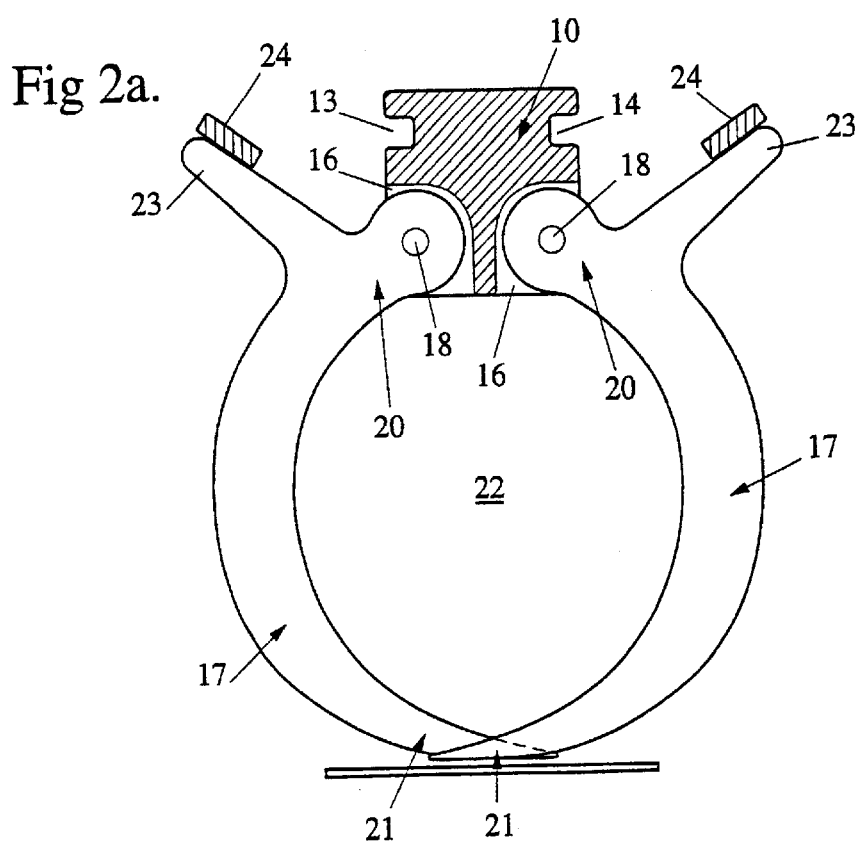
FIGS. 2A and 2B are schematic cross-sectional views showing the transport arrangement of the present invention in two different positions of use.
Figure 2B:
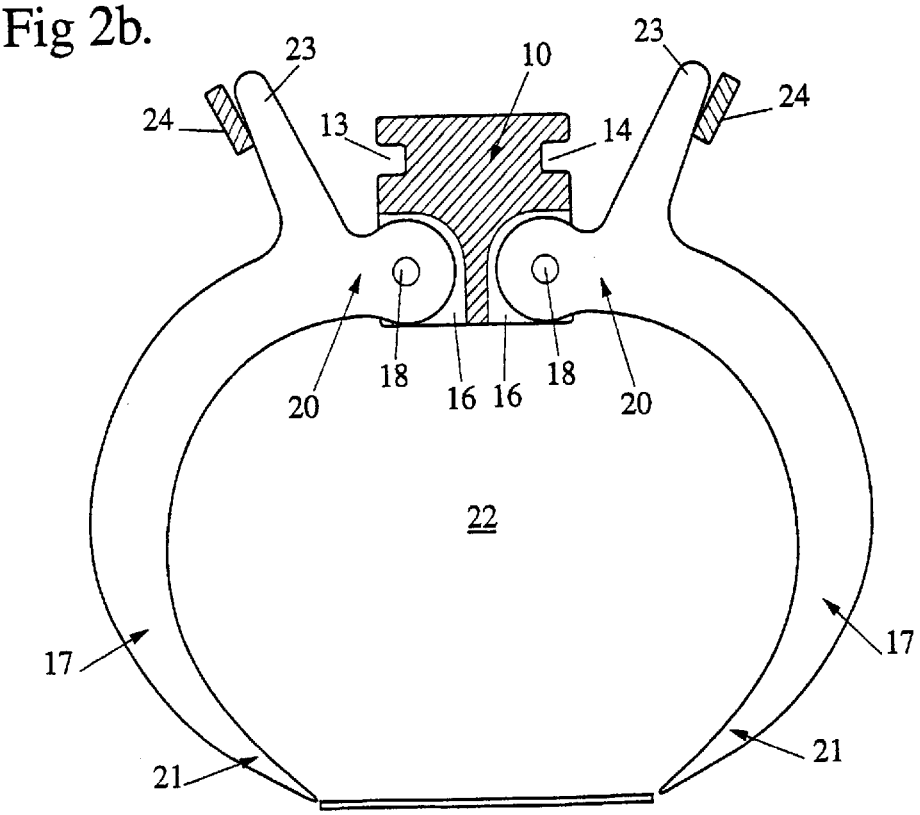
Figure 3A:
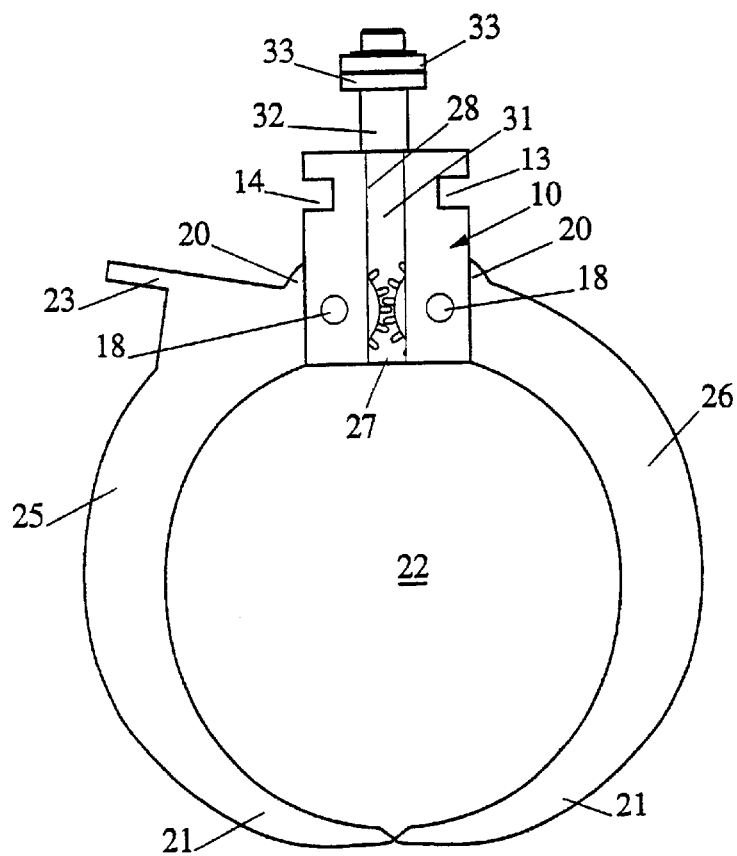
FIG. 3a is a front elevation of one element of a second preferred embodiment of the transport arrangement of the present invention showing the finger members in a closed position.
Figure 3B:
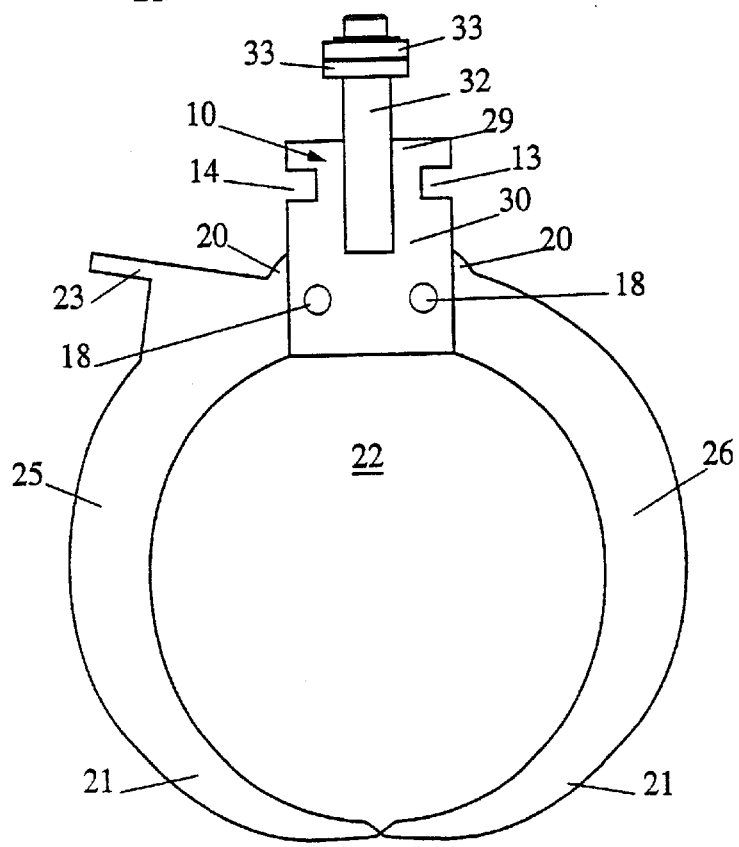
Figure 3C:
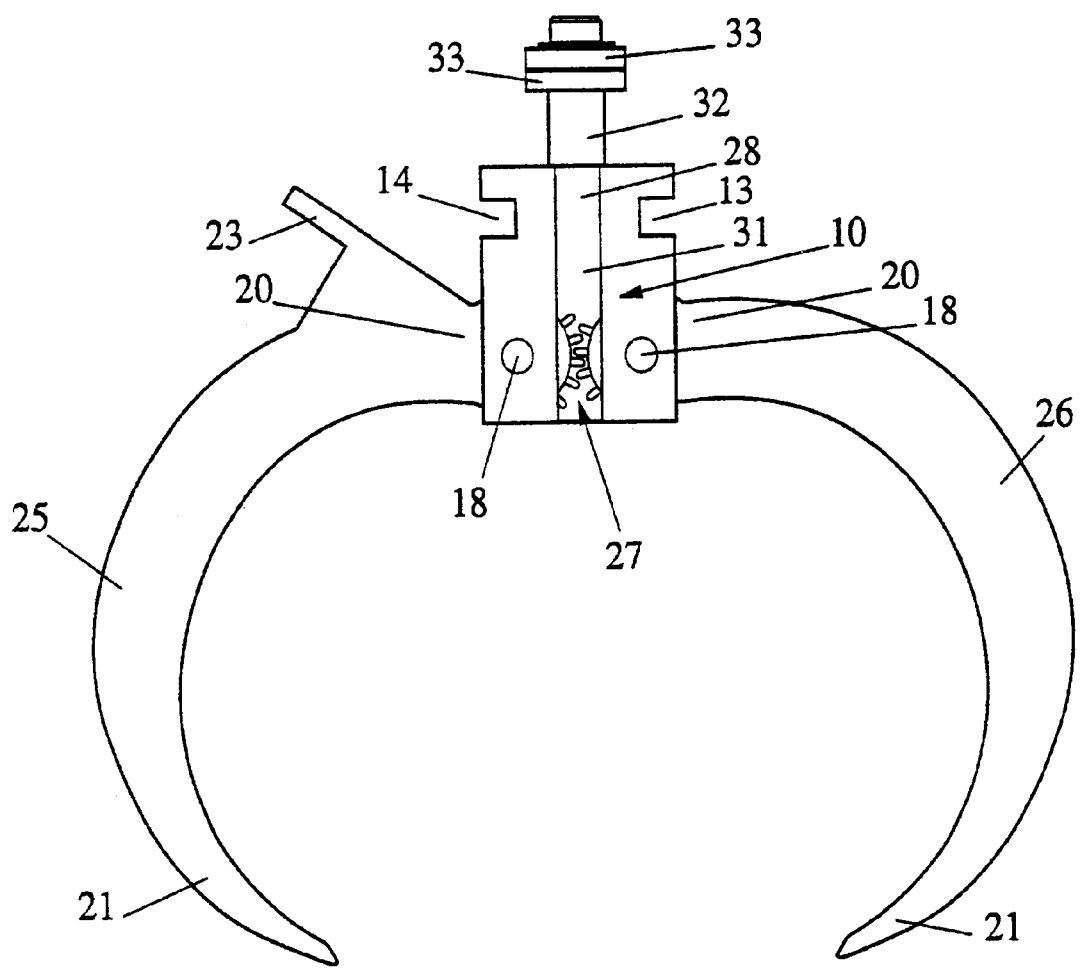
FIG. 3c is a view similar to FIG. 3a but showing the finger members in a second open position.

As shown in FIGS. 2A and 2B, the pivoting finger members 17 include an upper end zone 20 with a bore adapted to receive the pivot pin 18. The finger members depend downwardly and have a lower end zone 21 which is curved inwardly such that in a first closed position (FIG. 2A), a closed produce retaining zone 22 is formed immediately below the carrier members. The finger members 17, are conveniently substantially equally spaced along the conveyor so as to provide gaps between the finger members to allow dirt or other debris to fall harmlessly from the conveyor. As further shown in FIGS. 2A and 2B, each finger member 17 includes a laterally extending control arm 23, which at least in a section of the transport arrangement, are engaged by a control member 24 to appropriately position the finger members (either closed as in FIG. 2A) or to a plurality of open positions (FIG. 2B) to allow produce of certain predetermined sizes to be released from the retaining zone 22. The produce, once released may be placed on a delivery chute or further conveyor mechanism to be moved to a packing position or to any other desired treatment or processing station. While it has been shown in the annexed drawings that all finger members 17 are capable of pivoting movement, in other embodiments only some of these retaining members may be movably arranged.

Referring now to FIGS. 3a, 3b, 3c, 4, 5a and 5b, a second preferred embodiment is illustrated. In this embodiment an endless chain is made up of carrier blocks 10 each having a pair of opposed finger members 25, 26 pivoted at their upper ends 20 at 18 to the carrier blocks 10. A partial gear mechanism 27 interengages the upper ends 20 of the finger members 25, 26 such that if one finger member 25 is forced to pivot about its pivot pin 18, the other finger member 26 pivots about its pivot pin 18 in an opposite direction. The finger member 25 conveniently has a laterally extending control arm 23 that is selectably engagable in use to move the finger members 25, 26 towards or away from one another as desired. The carrier blocks 10 each include a groove formation 28 and a tongue formation 29 on opposite sides, the tongue formation 29 including a semicircular portion 30 engagable in a pivoting manner with a similar circular shaped portion 31 of the groove formation 28. Each tongue formation 28 has an upstanding circular shaft portion 32 with a pair of link members 33 secured thereto by a circlip or the like. The link members 33 respectively connect adjacent upstanding circular shaft portions 32 to maintain the required configuration of the finger members 25, 26, particularly as a curved portion or return section of the endless chain 15 is negotiated. As with the first embodiment, the carrier blocks 10 are retained in a desired elevational position by guide and support rails being positioned within opposed grooves 13.

Referring now to FIG. 5a, one end of an endless track or chain structure is illustrated having a plurality of side by side carrier blocks 10 with depending finger members 25, 26, only some of which are shown for the sake of clarity. The broken line shows the trajectory of the lower end or tip regions of the finger members 25, 26. In this manner an endless produce retaining zone 22 is formed having two essentially straight portions linked at either end by a semi-circular curved return portion. In this embodiment, the produce retaining zone 22 formed within three or more adjacent closed pairs of produce retaining members is substantially horizontal in both the straight portions as well as the two curved end or return portions. One only curved end or return portion 35 is shown in FIG. 5a. The return portion 35 includes a horizontally disposed sprocket wheel 36 with teeth engaging the shaft portions 32 of the tongue formations 29 of the carrier blocks 10. A similar sprocket wheel is disposed at the other end (not illustrated) of the arrangement with one of the sprocket wheels being driven to move the carrier blocks 10 and thereby the finger members 25, 26 along the defined track. The track is essentially defined by guide rails 37 which are horizontally disposed and spaced apart to engage within grooves 13 of the carrier blocks 10. The guide rails 37 are aligned with a circular flange 38 on each of the sprocket wheels 36 thereby defining a generally horizontal oval endless track with the guide rails 37 being essentially straight sections. It will of course be appreciated that other arrangements for the track may also be used.

FIG. 5a also illustratively represents an infeed area for the conveying mechanism. A singulating conveyor 39 of any suitable configuration is provided to carry the produce in single file to a collection zone 40. A pair of video cameras (not shown), may be provided mounted over the infeed conveyor 39 adjacent to the collection zone 40 in a known manner to achieve optical sizing and position information of the produce arranged in single file on the infeed conveyor 39. Positioning rails 41 are provided to engage the lever arms 23 of the finger members 26 to maintain the finger members 25, 26 closed prior to the collection zone 40. A further positioning rail 42 is provided to lift the lever arms 23 to open the finger members 25, 26 of the collection zone 40 and subsequently a third positioning rail 43 engages the lever arms 23 to close the finger members 25, 26 toward one another with the finger members 25, 26 closing to retain the produce items within the zone 22 with longitudinal spacing sensed by the optical sensing mechanism.

In this configuration, the produce items are conveyed along the guide track held within the zone 22 until they reach a particular transfer station 44 illustrated schematically in FIG. 5b. A plurality of such stations are provided with each station representing a discharge point for produce of a particular size or size range. The respective transfer stations 44 are activated as required when a particular produce of a certain or predetermined size range reaches the station in response to size and positioning information established by the optical sensing apparatus. At each transfer station 44, a gate 45 is provided activated by a solenoid 46 into one of two positions. In a first position as illustrated, the transfer bar 45" guides the lever arms 23 upwardly to move the finger members 25, 26 to an open position. In a second position the transfer bar 45' is raised to be aligned with the bar 43 so as to maintain the lever arms 23 in a position closing the finger members 25, 26 as they traverse the transfer position 44. If the gate 45 is moved to position 45", the lever arms 23 are moved to a position to release the produce that happens to be at that station to discharge same to a secondary transfer conveyor or simply to a packaging position. The finger members 25, 26 are maintained open for a short period by engagement of the lever arms 23 with a guide rail 47 and then returned to a closed position by the lever arms engaging with a still further guide rail 48. In this embodiment, the transfer stations 44 may be located at any position along the conveying mechanism.

In a possible alternative arrangement, instead of having positioning rails such as rails 41, 42, 43, the finger members 25, 26 may be arranged to be physically (but releasably) held in either an open condition or a closed condition relative to the associated carrier block or member 10. This may be done using spring loaded detents (or similar means) operable between the finger members 25, 26 and the carrier members 10. Thus at any point where a change is required, i.e. opening the finger members or closing the finger members, a solenoid would be provided to act on the lever arms 23 to move the finger members as desired between the releasable holding positions in either the open or closed conditions.

In a possible alternative arrangement that does not require the use of an optical sizing system, the control members 24 might be formed as rails which are positioned to progressively move the finger members 17 further apart as they move along a produce release portion of the movement of the transport arrangement. As a result relatively smaller produce items will be released prior to relatively larger items. The conveyor mechanism 15 may follow a substantially horizontal path of any desired format. At least a path that does not pass over or under any other part of the path. If, however, the pivot arrangements between the members 10 were of a different type (e.g. about a horizontal axis) it may be possible to have the conveyor 15 arranged in a substantially vertical plane.

FIGS. 6a, 6b and 6c illustrate a possible arrangement that is capable of operating in a vertical plane. In this embodiment, the finger members 25, 26 may be essentially similar to those of the preceding embodiments, particularly FIGS. 3a, 3b, 3c and 4. The carrier blocks or members 10 also include outwardly facing grooves 13, 14 adapted to co-operate with support rails 37 which may be formed by the inturned free edges of channel members 49, in a similar manner to previously described embodiments. The carrier members 10 further include a downwardly angled flange member 50 having a semicircular end surface 51 and a bore 52 to receive a pivot pin 53 therethrough. The reverse side of the carrier block 10 has a pocket 61 to receive a flange member 50 of the next adjacent block 10. The carrier members 10 also include bore holes 54 alignable with the bore 52 of the flange member 50 through which the pivot pin 53 can be located to provide a pivot connection between the carrier members 10. As shown in FIG. 6a, each carrier member 10 cannot rotate in a clockwise direction relative to the next adjacent carrier block on its right-hand side beyond the position illustrated as a result of the upper surface 55 of the flange members 50 engaging with a downward facing wall 56 of the pocket 61. It is, however, possible for each carrier member 10 to rotate or pivot in an anticlockwise direction (FIG. 6a) relative to the next adjacent carrier block on its right-hand side. Thus a chain of carrier members 10 formed in this way may be formed into an endless chain having a generally vertical plane as shown in FIG. 6c. Conveniently, vertically disposed sprocket wheels (not illustrated) would be provided at either end of the endless chain with the sprocket wheel teeth engaging on the semi-circular end surfaces 51 of the flanges 50. One such sprocket wheel at least would be driven to move the carrier blocks along the path defined by the support rails 37 and the sprocket wheels. Along the upper return path 63, the finger members 25, 26 are not externally acted upon and under their own weight they take up an open position as illustrated. A baffle member 57 is provided to protect the conveyor mechanism from loose dirt or the like, the loose dirt falling into the base of a containment trough 58 which likewise protects the lower run 59 of the conveyor mechanism. In the position illustrated, the finger members 25, 26 are maintained open as they travel from the upper return path 56 downwardly to a collection zone 40 illustrated where the finger members are moved inwardly to retain produce within the zone 22. An infeed conveyor 60 is provided to deliver produce items in single line to the collection zone 40 and in this embodiment, the infeed conveyor 60 does not need to be an elevating conveyor as shown in FIG. 5a. The appropriate positioning of the finger members 25, 26 and the optical size and position sensing of the produce being handled can be as described with reference to previously described embodiments. The transfer stations 44, however, would all be located along the lower rim 59 of the conveyor mechanism.

FIGS. 7a and 7b illustrate a still further preferred embodiment wherein the carrier members 10 and the associated finger members 25, 26 are adapted to operate in a manner similar to that described above with reference to FIGS. 6a, 6b and 6c except that the construction is somewhat different. In this case, the carrier members comprise a central body part 70 having spaced pairs of circular protuberances 71, 72 extending from either side, each of the protuberances having a bore 73 extending completely therethrough open on both sides of the body part 70. The protuberances 71, 72 act as a bearing for a respective one of the finger members 25 or 26 and a cover plate member 74 with a fixing shaft 75 is applied to either side of the body part 70. The respective fixing shafts 75 have a split free end 76 with an enlarged head portion 77 that allows the head portions 77 to clip through a bore 78 in the cover plate member 74. Thus in the assembled condition shown in FIG. 7b, the respective fixing shafts 75 of the cover plate members 74 hold the assembly together while permitting the finger members 25, 26 to pivot freely on the protuberances 71, 72. As with previous embodiments the finger member 25 may be pivoted as a result of external forces applied to the lever arms 23 and this pivoted movement is transmitted to the associated finger member 26 via the partial gear mechanism 27.

The central body part 70 of the carrier member 10 includes a pair of spaced grooves 13, 14 in an upper section again adapted to receive guide and support rails (not shown) when in use. Finally a boss member 79 with a transverse through bore 80 is provided on one side of the central body part 70 which is cooperable with a pair of spaced flanges 81, 82 each having a bore 83, 84 on the other side of an adjacent carrier member 10. A pivot shaft (not shown) would be provided extending through the bores 80, 83 and 84 to allow chain carrier members 10 and associated finger members 25, 26 as shown in FIG. 7b to be interconnected where the chain could be used in apparatus as generally described above with reference to FIG. 6c. Each of the finger members 25, 26 may also include a bore 85 part way along their lengths to receive a rubber or elastomeric grommet that will help space the figure members a controlled distance apart and further reduce the likelihood of chatter noise by the finger members hitting one another in use. When the chain is formed, the finger members 25, 26 will be spaced substantially uniformly along the chain a similar distance apart to the spacing between the finger members shown in FIG. 7b, that is, the spacing distance is relatively small and generally less than the width of the finger members at least at their free ends.

The claims defining the invention are as follows:

1. A transport arrangement for a produce sizing or sorting apparatus, said transport arrangement having an endless conveyor carrying a plurality of downwardly depending produce retaining members defining an elongate produce retaining zone below at least one portion of the endless conveyor, at least part of said produce retaining members being movable between a first closed position in which produce is held within said elongate produce retaining zone only by free support on said produce support regions located below the produce, and a plurality of further open positions enabling produce of predetermined sizes or size ranges to be released from said produce retaining zone.

2. A transport arrangement for a produce sizing or sorting apparatus having an endless conveyor defining at least a first path of movement, said endless conveyor carrying a plurality of transversely spaced and longitudinally spaced downwardly depending produce retaining members, said produce retaining members each having a produce support region at a free end, the free ends of said transversely spaced produce retaining members being located adjacent one another in a first closed position of said retaining members, a plurality of said longitudinally spaced produce retaining members each forming a produce retaining zone extending at least partially longitudinally in the direction of said first path of movement beneath at least part of said endless conveyor, at least some of said produce retaining members being moveable whereby at least the produce support regions of said retaining members move transversely away from opposed said produce retaining members move transversely away from opposed said produce retaining members to permit selective release of produce from said produce retaining zones, the produce support regions of said produce retaining members being located generally beneath said produce retaining zone when said produce retaining members are located in said first closed position.

3. A transport arrangement according to claim 2 wherein said produce retaining zone formed by each of said longitudinally spaced produce retaining members is of uniform cross-sectional dimension with said retaining members located in said first closed position.

4. A transport arrangement according to claim 3, wherein the produce retaining members are longitudinally spaced by a distance less than the smallest dimension of produce intended to be handled by the transport arrangement.

5. A transport arrangement according to claim 2, wherein the produce retaining members on one side of the produce retaining zone are all selectively movable.

6. A transport arrangement according to claim 5, wherein the produce retaining members on both sides of the produce retaining zone are all selectively movable.

7. A transport arrangement according to claim 2, wherein a plurality of carrier members pivotally connected to one another are provided to form said endless conveyor, each said carrier member carrying at least a pair of opposed said produce retaining members.

8. A transport arrangement according to claim 7 wherein each said carrier member carries at least two opposed pairs of said produce retaining members.

9. A transport arrangement according to claim 7, wherein each of said produce retaining members comprises a pair of finger members at least one said finger member of each said pair of finger members is pivotally movable relative to the carrier member.

10. A transport arrangement according to claim 9, wherein each said finger member of each said pair of finger members is selectably movable relative to the other said finger member of its pair of finger members.

11. A transport arrangement according to claim 9, wherein the finger members of each said pair of finger members are constrained to move in opposite directions.

12. A transport arrangement according to claim 9, wherein each said pivotable finger member carries a laterally extending arm engagable by control means upon movement of said endless conveyor to either move said pivotable finger member selectably to said open or a said closed position.

13. A transport arrangement according to claim 9, wherein one of said pivotable finger member carries a laterally extending arm engagable by control means upon movement of said endless conveyor to either move said pivotable finger member selectably to said open or a said closed position.

14. A sizing or sorting apparatus including a transport arrangement according to claim 2, further including an infeed conveyor means for feeding produce in single file to a collection zone of said transport arrangement and sizing and positioning means to determine the position and size or size range of produce delivered to said collection zone.

15. A transport arrangement for a produce sizing or sorting apparatus, said transport arrangement having a plurality of carrier members pivotally connected to one another to form an endless conveyor, each said carrier member having at least one finger member pivoted thereto for pivoting movement about a first axis such that the finger members depend downwardly from the carrier members to define a produce retaining zone when said finger members are in a first closed position, each said finger member having a produce support region at a free end located under said produce retaining zone when said finger members are in said first closed position, said produce retaining zone having a substantially uniform cross-section extending in the direction of movement of said endless conveyor along at least said portion of the endless conveyor and said produce retaining zone being bounded at least in part by a plurality of said finger members, at least some of said finger members being pivotable, about a respective said first axis disposed generally parallel to said endless conveyor, to an open position enabling produce to be released from said produce retaining zone, and each said carrier member being pivotal relative to an adjacent said carrier member about an upright axis generally perpendicular to said endless conveyor.

16. A transport arrangement according to claim 15 wherein each said carrier member carries at least two opposed pairs of said finger members.

17. A transport arrangement according to claim 16, wherein at least one said finger member of each said pair of finger members is pivotally movable relative to the carrier member.

18. A transport arrangement according to claim 17, wherein each said finger member of each said pair of said finger members is selectably movable relative to the other said finger member of its pair of said finger members.

19. A transport arrangement according to claim 17, wherein the finger members of each said pair are constrained to move in opposite directions.

20. A transport arrangement according to claim 19, wherein one of said pivotable finger members of each said pair carries a laterally extending arm engaged, in use, by control means upon movement of said endless conveyor to either move said one finger member selectably to a said open or a said closed position, them movement of said one finger member causing movement of the other finger member of the pair of finger members in an opposite direction relative to the one finger member.

21. A transport arrangement according to claim 15, wherein each said pivotable finger member carries a laterally extending arm engaged, in use, by control means upon movement of said endless conveyor to either move said pivotable finger member selectably to said open or a said closed position.

22. A transport arrangement for a produce sizing or sorting apparatus, said transport arrangement having an endless conveyor means carrying a plurality of downwardly depending produce retaining members defining an elongate produce retaining zone below at least one portion of the endless conveyor means, at least part of said produce retaining members being movable between a first closed position in which produce is retained within said elongate retaining zone with a produce support region of said retaining members located beneath said elongated retaining zone, and a plurality of further open positions enabling produce of predetermined sizes or size ranges to be released from said produce retaining zone at a predetermined transfer station, wherein the predetermined transfer station is one of a plurality of transfer stations, by an actuation means characterised in that the actuation means extends at least partially along said endless conveyor means and cooperates with at least some of said produce retaining members as the produce retaining members are moved by said endless conveyor means to hold said produce retaining members in said first closed position between said transfer stations and through said transfer stations not being said predetermined transfer station at least while carrying produce, said actuation means further begin cooperable with at least some of said produce retaining members at said predetermined transfer station as said produce retaining members are moved by said endless conveyor to hold the produce retaining members open during the release of the produce at the predetermined station.

23. The transport arrangement according to claim 22 wherein the actuation means is adapted to hold the produce retaining means closed when the produce is at one of the plurality of transfer stations that is not the predetermined transfer station.

* * * * *